United States Patent
Inoue

(10) Patent No.: US 7,086,068 B2
(45) Date of Patent: Aug. 1, 2006

(54) OPTICAL DISC APPARATUS WHICH DETERMINES TRAY MOVEMENT SPEEDS

(75) Inventor: Katsuichi Inoue, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 692 days.

(21) Appl. No.: 10/410,272

(22) Filed: Apr. 10, 2003

(65) Prior Publication Data
US 2003/0227836 A1  Dec. 11, 2003

(30) Foreign Application Priority Data
May 15, 2002  (JP) .......................... P2002-139532

(51) Int. Cl.
*G11B 17/04* (2006.01)

(52) U.S. Cl. .................. 720/602; 369/30.36
(58) Field of Classification Search ..................... None
See application file for complete search history.

(56) References Cited

U.S. PATENT DOCUMENTS

| 5,210,725 A | * | 5/1993 | Kase et al. ............. 360/99.06 |
| 5,473,590 A | * | 12/1995 | Yokota et al. ............. 369/59.2 |
| 5,574,711 A | * | 11/1996 | Nakamichi .................. 720/602 |
| RE37,170 E | * | 5/2001 | Kurosu ....................... 720/605 |
| 6,236,527 B1 | * | 5/2001 | Uchiike et al. ............... 360/75 |
| 6,621,784 B1 | * | 9/2003 | Liao et al. .................. 720/601 |
| 6,643,241 B1 | * | 11/2003 | Takeda ....................... 720/602 |

FOREIGN PATENT DOCUMENTS

| JP | 6-338119 | 12/1994 |
| JP | 2000-285561 | 10/2000 |
| JP | 2001-23273 | 1/2001 |
| JP | 2001-216702 | 8/2001 |

* cited by examiner

*Primary Examiner*—Andrea Wellington
*Assistant Examiner*—Nathan Danielsen
(74) *Attorney, Agent, or Firm*—Morgan, Lewis & Bockius LLP

(57) ABSTRACT

In an optical disc apparatus, a loading operation and an unloading operation are performed a plurality of times while changing the movement speed of a tray. A movement speed of the tray at which a shock that is produced during a movement of the tray is smaller than an upper limit, and a time period required for the loading operation and the unloading operation is shortest is determined as the movement speed of the tray in the loading operation and the unloading operation. An optical disc placed on the tray can be prevented from being damaged by a shock produced during a movement of the tray, and the time period required for the loading operation and the unloading operation can be prevented from being prolonged.

5 Claims, 4 Drawing Sheets

OPTICAL DISC APPARATUS WHICH DETERMINES TRAY MOVEMENT SPEEDS

The present disclosure relates to the subject matter contained in Japanese Patent Application No. 2002-139532 filed May 15, 2002, which is incorporated herein by reference in its entirety.

BACKGROUND OF THE INVENTION

1. Field of the Invention

The present invention relates to an optical disc apparatus in which a tray on which an optical disc such as a CD or a DVD is placed is moved to perform operations of loading and unloading the optical disc.

2. Description of the Related Art

Conventionally, a reproduction apparatus which reads out and reproduces data recorded on an optical disc such as a CD or a DVD, and a recording apparatus which records supplied data onto such an optical disc are used. Hereinafter, such a reproduction apparatus and a recording apparatus are generally referred to as an optical disc apparatus. A tray which is disposed in an optical disc apparatus is configured so as to be movable between a loading position where an optical disc placed on the tray is to be loaded into a main unit, and a discharging position where the optical disc is to be discharged from the main unit. In the loading position, the tray is housed in the main unit, and, in the discharging position, the tray is pulled out from the main unit.

In the case where an eject switch disposed on the main unit is operated when the tray is in the loading position, the optical disc apparatus performs an unloading operation of moving the tray from the loading position to the discharging position. In the case where the eject switch disposed on the main unit is operated when the tray is in the discharging position, the optical disc apparatus performs a loading operation of moving the tray from the discharging position to the loading position. In some other optical disc apparatuses, the loading operation is performed when the tray in the discharging position is pushed toward the loading position. In a usual optical disc apparatus, the tray is moved by a torque exerted by a DC motor.

Among optical disc apparatuses, the friction between butting surfaces of a main unit and a tray is varied depending on working accuracies of the tray and the main unit. In some apparatuses, the friction is large, and, in some other apparatuses, the friction is small. In a conventional optical disc apparatus, during loading and unloading operations, a predetermined voltage is applied to a DC motor. Therefore, an optical disc apparatus in which the friction between a main unit and a tray is large has a problem in that the movement speed of the tray is so low that the loading and unloading operations require a long time period. By contrast, in an optical disc apparatus in which the friction between a main unit and a tray is small, the movement speed of the tray is so high that an optical disc placed on the tray is vibrated by a shock produced when the tray is moved or stopped, thereby causing a problem in that the optical disc rubs against the tray to be damaged.

In order to solve the problems, a technique in which a voltage to be applied to a DC motor is changed so that a tray is moved at a predetermined speed in loading and unloading operations has been proposed in JP-A-6-338119, JP-A-2000-285561, JP-A-2001-216702, and JP-A-2001-23273.

However, various factors such as the tray movement speed, the friction between butting surfaces of a main unit and the tray, and the butting state are complicatedly intertwined with one another to determine the degree of a shock which is produced during a movement of the tray. Among apparatuses, therefore, the degree of a shock which is produced during a movement of a tray is varied even at the same tray movement speed.

The conventional technique described above is that in which variation among apparatuses in the time periods of loading and unloading operations is suppressed by setting the tray movement speed in the loading and unloading operations to a predetermined one, and is not that in which variation among apparatuses in a shock produced during a movement of a tray is suppressed. In some apparatuses, therefore, a large shock remains to be produced during a movement of a tray, and an optical disc placed on the tray cannot be sufficiently prevented from rubbing against the tray to be damaged.

SUMMARY OF THE INVENTION

It is an object of the invention to provide an optical disc apparatus in which a shock produced during a movement of a tray is suppressed and an optical disc is surely prevented from being damaged during a movement of the tray, whereby the reliability is enhanced.

It is another object of the invention to provide an optical disc apparatus in which both the time period required for loading and unloading operations, and a shock produced during a movement of a tray are considered so that an optical disc is prevented from being damaged during a movement of the tray and the usability is improved.

In order to solve the problem, an optical disc apparatus of the invention is configured in the following manner.

An aspect of the invention provides an optical disc apparatus comprising: a tray on which a disc to be loaded into a main unit is to be placed; a tray moving section which moves the tray between a loading position where the disc is to be loaded into the main unit, and a discharging position where the disc is to be discharged from the main unit; a shock detecting section which detects a shock that is produced during a movement of the tray by the tray moving section; and a controlling section which, on the basis of the shock detected by the shock detecting section, determines a speed of a movement of the tray by the tray moving section.

According to the configuration, the shock detecting section detects a shock that is produced during a movement of the tray, and, on the basis of the shock detected by the shock detecting section, the controlling section determines the speed of a movement of the tray. For example, the movement speed of the tray may be determined in the following manner.

[1] The tray is moved a plurality of times at different movement speeds, and the shock detecting section detects the degree of the shock for each of the tray movement speeds. Among movement speeds at which the degree of a shock produced during a movement of the tray is smaller than a predetermined upper limit of a shock, the highest movement speed is determined as the movement speed of the tray. The upper limit of a shock is a degree at which a disc placed on the tray is not vibrated to be rubbed against the tray, and is not damaged. According to the configuration, a disc placed on the tray can be surely prevented from being damaged by a shock produced during a movement, and the time period required for moving the tray between the loading position and the discharging position can be prevented from being prolonged. Therefore, the usability can be improved.

Alternatively, the movement speed of the tray may be determined in the following manner.

[2] The tray is moved a plurality of times at different movement speeds, and the shock detecting section detects the degree of the shock for each of the tray movement speeds. Among movement speeds at which the degree of a shock produced during a movement of the tray is smaller than a predetermined upper limit of a shock, and which do not exceed a predetermined upper speed limit, the highest movement speed is determined as the movement speed of the tray. In the same manner as [1] above, the upper limit of a shock is a degree at which a disc placed on the tray is not vibrated to be rubbed against the tray, and is not damaged. The upper speed limit is a speed at which a disc placed on the tray is not damaged by a shock that is produced when braking is applied to stop the tray moving at the speed. According to the configuration, not only when the tray is moved, but also when the tray is stopped, a disc placed on the tray can be prevented from being damaged. In the same manner as [1] above, the time period required for moving the tray between the loading position and the discharging position can prevented from being prolonged, so that the usability can be improved.

According to another aspect of the invention, the controlling section determines separately a speed of a movement of the tray from the loading position to the discharging position, and a speed of a movement of the tray from the discharging position to the loading position.

According to the configuration, the speed of a movement from the loading position to the discharging position, and that of a movement from the discharging position to the loading position are individually determined. Therefore, the tray movement speed can be determined in accordance with the movement direction of the tray.

DETAILED DESCRIPTION OF THE PREFFERED EMBODIMENTS

Hereinafter, an optical disc apparatus which is an embodiment of the invention will be described.

Figure 1:
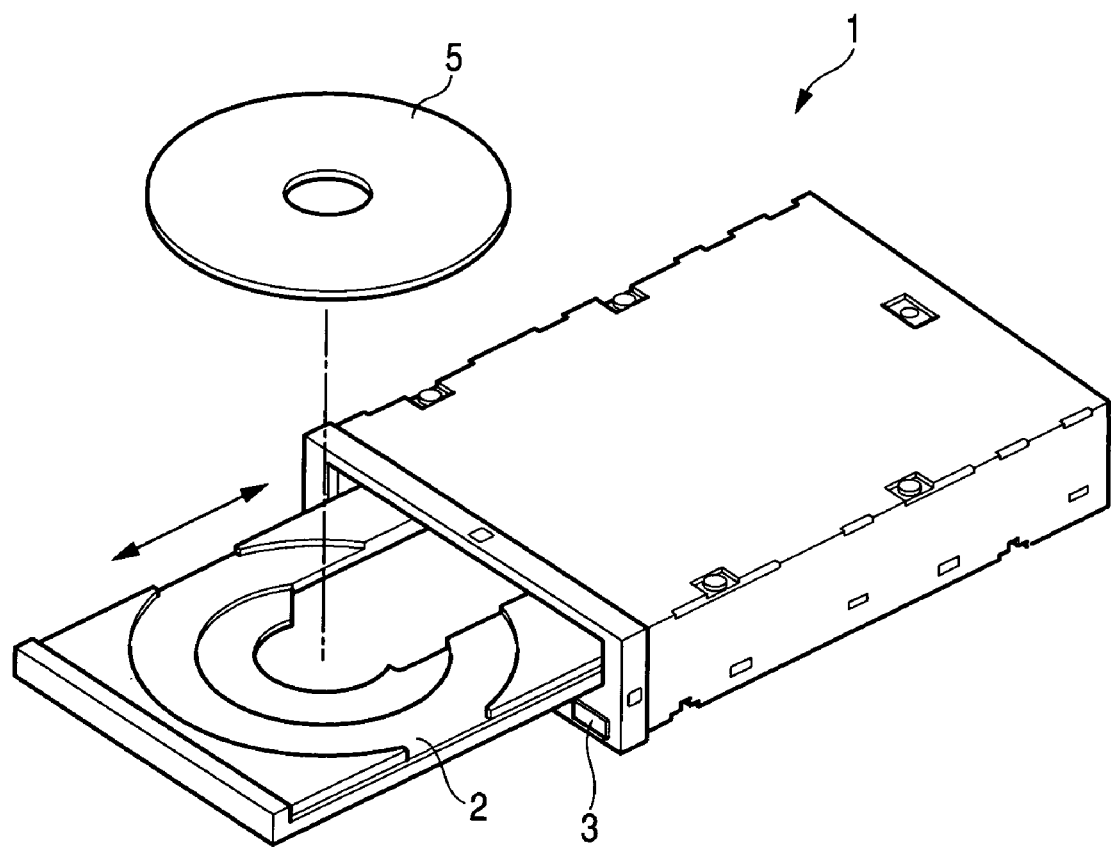
FIG. 1 is an external view of an optical disc apparatus which is an embodiment of the invention.

FIG. 1 is an external view of an optical disc apparatus which is an embodiment of the invention.

FIG. 1 schematically shows the optical disc apparatus. In the figure, 1 denotes a main unit of the optical disc apparatus, and 2 denotes a tray on which an optical disc 5 such as a CD (including a CD-R and CD-R/W) or a DVD (including a DVD-R and a DVD-RAM) is to be placed. The tray 2 is mounted so as to be movable in directions indicated by the arrows in the figure. In the optical disc apparatus 1, when the tray 2 is in a loading position (not shown) in which the tray 2 is housed in the main unit 1, the optical disc 5 which is placed on the tray 2 is held (chucked) onto the rotation shaft of a spindle motor, and the optical disc 5 is then rotated. At this time, the tray 2 is lowered downward, and the optical disc 5 floats from the tray 2. In FIG. 1, 3 denotes an eject switch.

Figure 2:
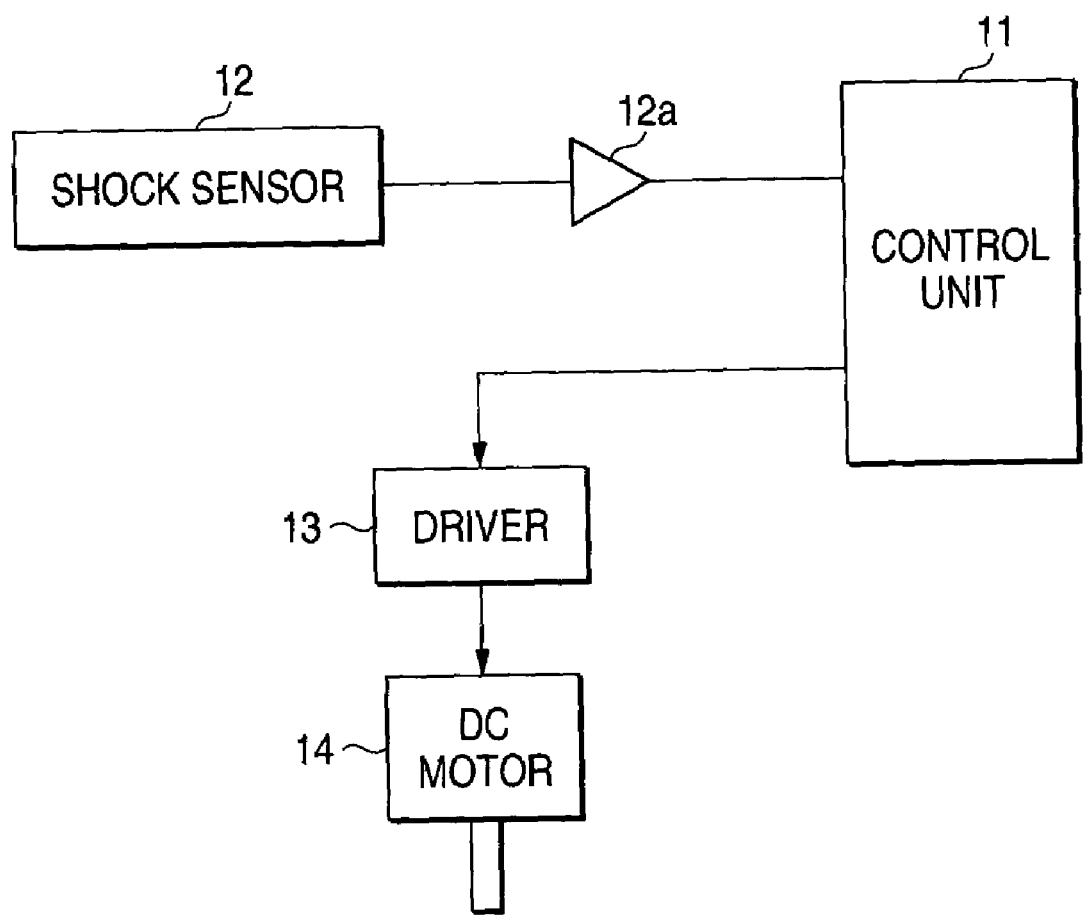
FIG. 2 is a diagram showing the configuration of a tray moving mechanism in the optical disc apparatus of the embodiment.

FIG. 2 is a block diagram showing the configuration of a tray moving mechanism in the optical disc apparatus of the embodiment. In the figure, 11 denotes a control unit which controls the operation of the main unit. The control unit 11 controls a movement of the tray 2, and also performs various controls on, for example, recording of data onto the optical disc 5, and reading of data from the optical disc 5. The reference numeral 12 denotes a shock sensor for detecting the degree of a shock which is produced in the main unit of the apparatus. Usually, the optical disc apparatus 1 having a function (recording function) of recording data onto the optical disc 5 is provided with a shock sensor in order to ensure the quality of the data recorded onto the optical disc 5. In the optical disc apparatus 1, the shock sensor detects the degree of a shock which is produced in the main unit, and, when a shock of a degree that is larger than a predetermined value is produced, data recording is temporarily stopped, whereby the quality of data recorded onto the optical disc 5 is ensured. In the optical disc apparatus 1 having the recording function, since the main unit is originally provided with the shock sensor 12, the production cost of the main unit is not increased. An output of the shock sensor 12 is amplified by an amplifier 12a, and then supplied to the control unit 11.

The reference numeral 13 denotes a driver which controls an input voltage of a DC motor 14. The tray 2 is moved by a torque exerted by the DC motor 14. The tray 2 is configured so as to be movable between the discharging position shown in FIG. 1, and the loading position where the tray is housed in the main unit. An operation of moving the tray 2 from the loading position to the discharging position is called an unloading operation, and that of moving the tray 2 oppositely or from the discharging position to the loading position is called a loading operation. In the case where the tray 2 is in the loading position when the eject switch 3 is operated, the optical disc apparatus 1 performs the unloading operation, and, in the case where the tray 2 is in the discharging position when the eject switch is operated, the apparatus performs the loading operation. Also when the tray 2 in the discharging position is pushed toward the loading position, the apparatus performs the loading operation. A plurality of sensors for detecting the position of the tray 2 are disposed in the optical disc apparatus 1.

Hereinafter, the loading and unloading operations will be briefly described.

Figure 3:
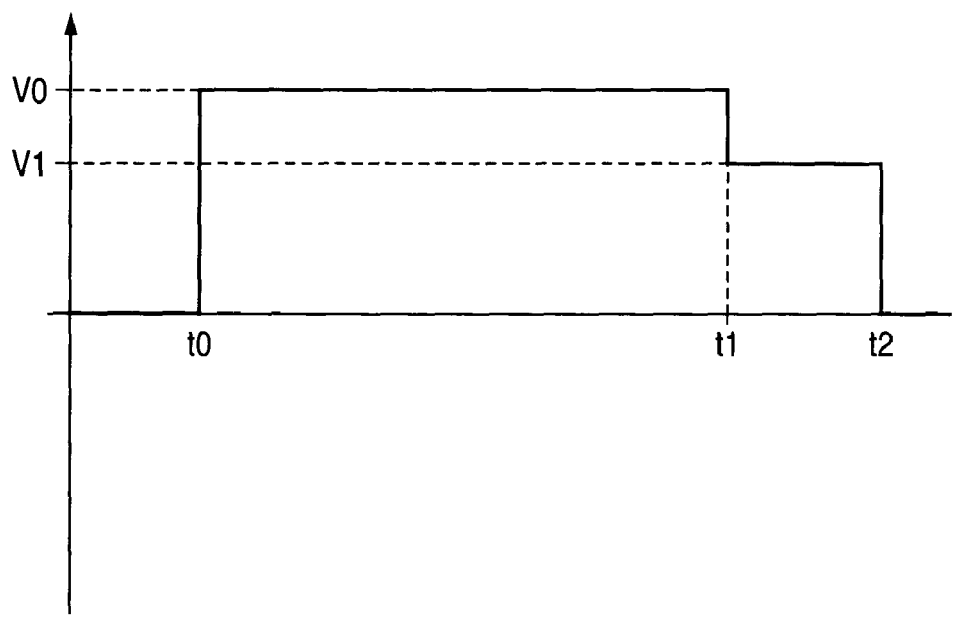
FIG. 3 is a timing chart of a loading operation.

First, the loading operation will be described. FIG. 3 is a timing chart of the input voltage of the DC motor in the loading operation. At timing t0 shown in FIG. 3, the eject switch 3 is operated. When the control unit 11 detects that the eject switch 3 is operated, the control unit instructs the drive 13 to perform either of the loading operation or the unloading operation in accordance with the position of the tray 2. The case where the tray 2 is in the discharging position and the loading operation is instructed will be described.

The driver 13 supplies a loading voltage V0 which is instructed by the control unit 11, to the DC motor 14. The loading voltage V0 is previously determined by a loading/unloading setting process which will be described later. The torque of the DC motor 14 acts on the tray 2 via gears in a direction along which the tray is moved toward the loading position. When the tray 2 is moved from the discharging position toward the loading position and then reaches the loading position, a loading position detecting sensor (not shown) is turned on and the control unit detects that the tray 2 reaches the loading position. At timing t1 shown in FIG. 3, the loading position detecting sensor is turned on. When the tray 2 reaches the loading position, the gears for transmitting the torque of the DC motor 14 are switched over so that the torque of the DC motor 14 that has acted in the direction along which the tray 2 is moved toward the loading position acts in a direction along which the tray 2 is lowered downward.

When the tray 2 reaches the loading position (the loading position detecting sensor is turned on), the control unit 11 instructs the driver 13 to switch over the input voltage of the DC motor 14 from the loading voltage V0 to a chucking voltage V1. In accordance with the instructions from the control unit 11, the driver 13 switches over the input voltage of the DC motor 14 from the loading voltage V0 to the chucking voltage V1. The chucking voltage V1 is lower than the loading voltage V0. The loading voltage V0 has a polarity which is identical with that of the chucking voltage V1.

When the tray 2 is lowered downward at the loading position, also the optical disc 5 placed on the tray 2 is lowered. The rotation shaft of the spindle motor (not shown) is positioned below the optical disc 5, and the optical disc 5 is held (chucked) onto the rotation shaft of the spindle motor. The optical disc apparatus 1 has a known configuration in which the optical disc 5 is held onto the rotation shaft of the spindle motor by using a magnet. When the tray 2 is lowered to the lowest level, a chucking detecting sensor (not shown) which detects completion of a chucking operation is turned on, and it is detected that the loading operation is completed. At timing t2 shown in FIG. 3, the chucking detecting sensor is turned on. At this time, the optical disc 5 which is held by the rotation shaft of the spindle motor floats from the tray 2.

When the chucking detecting sensor is turned on, the control unit 11 instructs the driver 13 to stop the supply of the voltage to the DC motor 14. In accordance with the instructions, the driver 13 stops the supply of the voltage to the DC motor 14. As a result, the rotation of the DC motor 14 is stopped.

In the above, the description has been made on the assumption that the optical disc 5 is placed on the tray 2. In the case where the optical disc 5 is not placed on the tray, the loading operation is performed in the same manner while the optical disc 5 to be held by the spindle motor does not exist.

Figure 4:
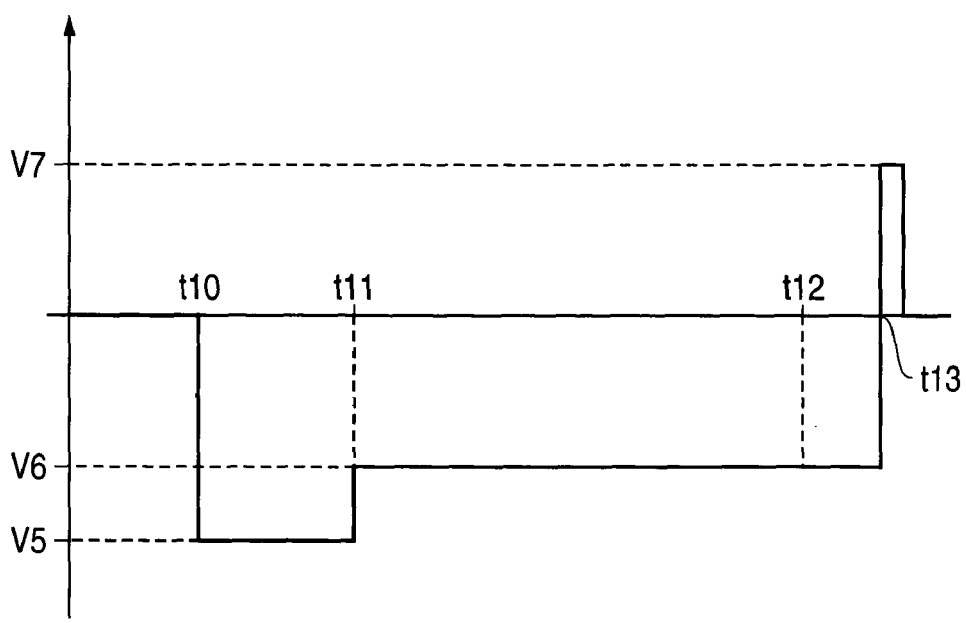
FIG. 4 is a timing chart of an unloading operation.

Next, the unloading operation will be described. FIG. 4 is a timing chart of the input voltage of the DC motor in the unloading operation. At timing t10, the eject switch 3 is operated. At this time, the tray 2 is in the loading position. When the control unit 11 detects that the eject switch 3 is operated, the control unit instructs the drive 13 to perform the unloading operation.

The driver 13 supplies an unchucking voltage V5 which is instructed by the control unit 11, to the DC motor 14. The unchucking voltage V5 has a polarity which is opposite to that of the chucking voltage V1. At this time, the torque of the DC motor 14 acts on the tray 2 in a direction along which the tray is raised upward. The optical disc 5 which is held by the rotation shaft of the spindle motor butts against the tray 2 which is pushed up. The optical disc apparatus 1 further pushes up the tray 2 to detach the optical disc 5 from the rotation shaft of the spindle motor (cancel the chucking state). The absolute value of the unchucking voltage V5 is set to be relatively large so that the optical disc 5 can be detached from the rotation shaft of the spindle motor against the magnetic force of the magnet. The unchucking voltage V5 is also previously determined.

When the optical disc 5 is unchucked and the tray 2 is pushed up to the highest level, an unchucking sensor (not shown) is turned on. The chucking sensor may serve also as the unchucking sensor, or the unchucking sensor may be separately disposed. When the unchucking sensor is turned on, the control unit 11 instructs the driver 13 to switch over the input voltage of the DC motor 14 from the unchucking voltage V5 to an unloading voltage V6. In accordance with the instructions from the control unit 11, the driver 13 switches over the input voltage of the DC motor 14 from the unchucking voltage V5 to the unloading voltage V6 (timing t11 shown in FIG. 4). At this time, the gears for transmitting the torque of the DC motor 14 are switched over so that the torque of the DC motor 14 that has acted in the direction along which the tray 2 is pushed up acts in a direction along which the tray 2 is moved in the discharging direction.

The unloading voltage V6 has a polarity which is identical with that of the unchucking voltage V5, and the absolute value of the unloading voltage is smaller than that of the unchucking voltage V5. The unloading voltage V6 is previously determined by the loading/unloading setting process which will be described later.

When the tray 2 is moved by a predetermined distance toward the discharging position, a discharging position sensor (not shown) is turned on. The position where the discharging position sensor is turned on is placed short of the discharging position. At timing t12 shown in FIG. 4, the discharging position sensor is turned on. When the discharging position sensor is turned on, the control unit 11 waits for a predetermined time period (timing t13 shown in FIG. 4) to elapse, and then instructs the driver 13 to apply the brake. In accordance with the instructions from the control unit 11, the driver 13 supplies a braking voltage V7 to the DC motor 14 for a predetermined time period to stop the movement of the tray 2. The braking voltage V7 has a polarity which is opposite to that of the unloading voltage V6. After the supply of the braking voltage V7, the driver 13 stops the supply of the voltage to the DC motor 14. As a result, the tray 2 is stopped at the discharging position, and the unloading operation is completed.

Next, the loading/unloading setting process in which the loading voltage V0 and the unloading voltage V6 are set will be described. The loading/unloading setting process may be implemented under the state where the optical disc 5 is placed on the tray 2, or under the state where the optical disc 5 is not placed on the tray.

Figure 5:
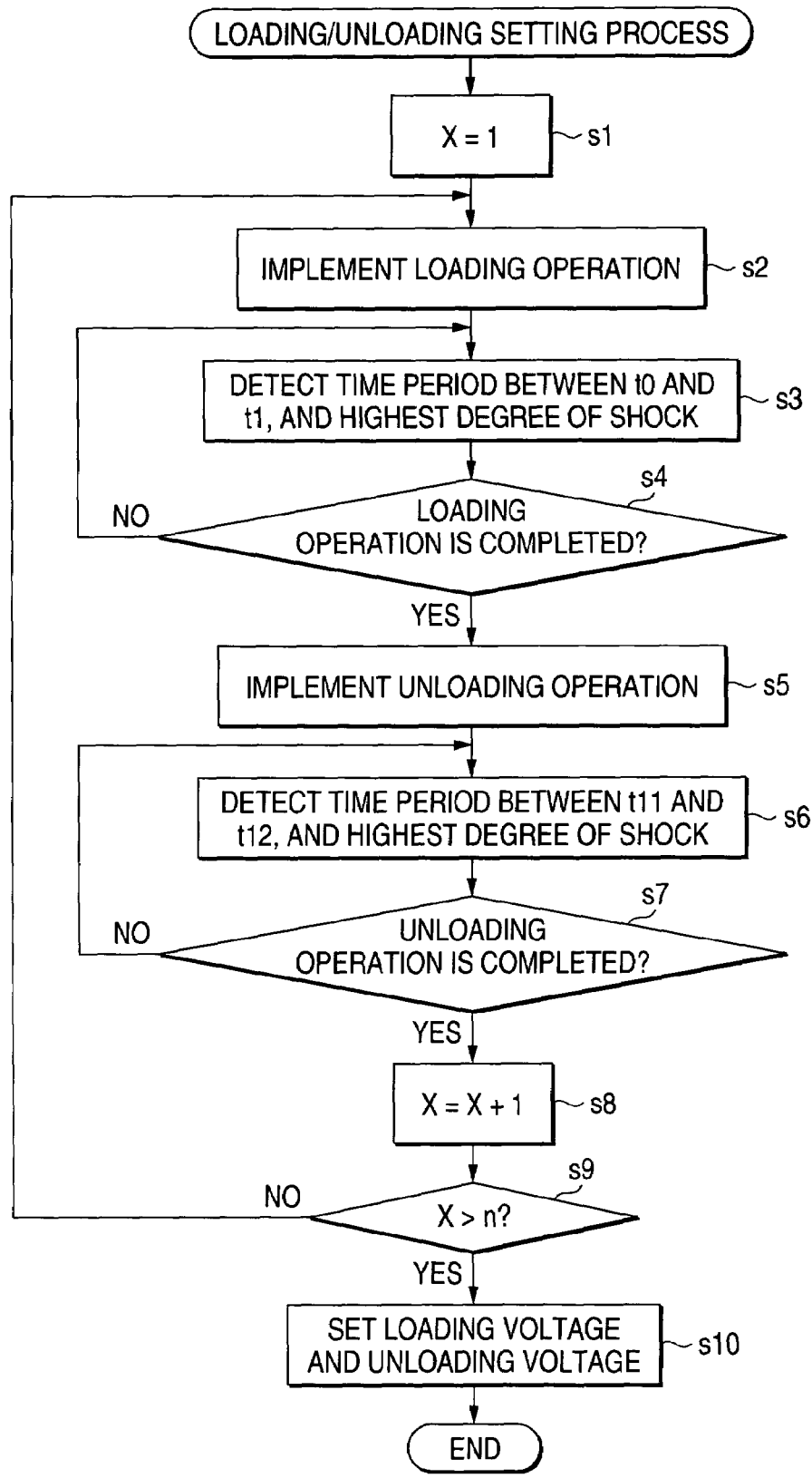
FIG. 5 is a flowchart showing a loading/unloading setting process.

FIG. 5 is a flowchart showing the loading/unloading setting process. In the optical disc apparatus 1 of the embodiment, for each of the loading voltage and the unloading voltage, maximum and minimum voltages are previously set. For the loading voltage, n steps of measuring voltages Va1 to Van are set in the range between the maximum and minimum voltages. For the unloading voltage also, n steps of measuring voltages Vb1 to Vbn are set in the range between the maximum and minimum voltages.

The control unit 11 sets x=1 (s1), and implements the above-described loading operation (s2). In step s2, the loading operation is performed while the loading voltage V0 is set to the voltage Vax of the x-th step. During the loading operation, the control unit 11 detects the time period between timings t0 and t1 shown in FIG. 3, and the highest degree of a shock which is supplied from the shock sensor 12 during this period (s3). Since the time period between timings t0 and t1 is detected, it is possible to detect the movement speed of the tray 2 in the case where the loading voltage V0 is Vax.

When the loading operation is completed (s4), the control unit 11 starts the unloading operation which has been described above (s5). In step s5, the unloading operation is performed while the unloading voltage V6 is set to the voltage Vbx of the x-th step. During the unloading operation, the control unit 11 detects the time period between timings t11 and t12 shown in FIG. 4, and the highest degree of a shock which is supplied from the shock sensor 12 during this period (s6). Since the time period between timings t11 and t12 is detected, it is possible to detect the movement speed of the tray 2 in the case where the unloading voltage V6 is Vbx. When the unloading operation is completed (s7), the control unit 11 increments x by 1 (s8). Then, the control unit judges whether x is larger than n or not (s9). If x is not larger than n, the control returns to step s2 to repeat the above-described process.

The control unit 11 implements an n umber of loading operations in which the loading voltage V0 is set to Va1 to Van, and an n umber of unloading operations in which the unloading voltage V6 is set to Vb1 to Vbn. Thereafter, it is judged in step s9 that x is larger than n, and the control proceeds to step s10 to set the loading voltage V0 and the unloading voltage V6. In step s10, the value of the loading voltage V0 at which, in the n umber of loading operations, the highest degree of a shock that is supplied from the shock sensor 12 does not exceed a predetermined value (an upper limit of a shock) and the time period between timings t0 and t1 is shortest is set as the loading voltage V0 of the subsequent loading operations. Furthermore, the value of the unloading voltage V6 at which, in the n umber of unloading operations, the highest degree of a shock that is supplied from the shock sensor 12 does not exceed a predetermined value (an upper limit of a shock) and the time period between timings t11 and t12 is shortest is set as the unloading voltage V6 of the subsequent unloading operations.

As apparent from the above description, the loading voltage V0 and the unloading voltage V6 are set for each optical disc apparatus 1.

In the control unit 11, the movement speed of the tray 2 in the loading operation is determined by setting the loading voltage V0, and that of the tray 2 in the unloading operation is determined by setting the unloading voltage V6.

The upper limit of a shock is a degree at which, during a movement of the tray 2, the optical disc 5 placed on the tray 2 is not vibrated to be rubbed against the tray 2, and is not damaged. According to the configuration, the optical disc 5 can be surely prevented from being damaged by a shock produced during a movement of the tray 2. Furthermore, the time periods required for the loading and unloading operations can be prevented from being prolonged. Therefore, the usability can be improved.

Since the loading voltage V0 in the loading operation, and the unloading voltage V6 in the unloading operation are individually determined, the loading voltage V0 and the unloading voltage V6 can be optimally set for the corresponding one of the loading and unloading operations.

When the loading/unloading setting process is implemented at an adequate timing, the loading voltage V0 and the unloading voltage V6 can be optimally reset in accordance with the surrounding environment, a secular change of the optical disc apparatus 1, and the like.

Each time when the loading operation is performed by using the loading voltage V0 which is set in the loading/unloading setting process, the highest degree of a shock which is detected by the shock sensor 12, and the time period between timings t0 and t1 may be measured. When one of the measured values is changed by a predetermined value or larger as compared with the preset value, an annunciation for re-implementation of the loading/unloading setting process may be made. According to the configuration, the loading voltage V0 and the unloading voltage V6 can be reset by the user at a timing according to the surrounding environment, a secular change of the optical disc apparatus 1, and the like.

Each time when the unloading operation is performed by using the unloading voltage V6 which is set in the loading/unloading setting process, the highest degree of a shock which is detected by the shock sensor 12, and the time period between timings t11 and t12 may be measured. When one of the measured values is changed by a predetermined value or larger as compared with the preset value, an annunciation for re-implementation of the loading/unloading setting process may be made. According to the configuration, the loading voltage V0 and the unloading voltage V6 can be reset by the user at a timing according to the surrounding environment, a secular change of the optical disc apparatus 1, and the like.

In place of the annunciation, re-implementation of the loading/unloading setting process may be automatically performed.

In the embodiment, in step s10, the value of the loading voltage V0 at which the highest degree of a shock that is supplied from the shock sensor 12 does not exceed the predetermined value (the upper limit of a shock) and the time period between timings t0 and t1 is shortest is set as the loading voltage V0 of the subsequent loading operations, and the value of the unloading voltage V6 at which the highest degree of a shock that is supplied from the shock sensor 12 does not exceed the predetermined value (the upper limit of a shock) and the time period between timings t11 and t12 is shortest is set as the unloading voltage V6 of the subsequent unloading operations. Alternatively, a lower limit may be set for the time periods between timings t0 and t1, and timings t11 and t12. Specifically, the value of the loading voltage V0 at which the highest degree of a shock that is supplied from the shock sensor 12 does not exceed the predetermined value (the upper limit of a shock) and the time period between timings t0 and t1 is not shorter than the lower limit and is shortest may be set as the loading voltage V0 of the subsequent loading operations. Similarly, the value of the unloading voltage V6 at which the highest degree of a shock that is supplied from the shock sensor 12 does not exceed the predetermined value (the upper limit of a shock) and the time period between timings t11 and t12 is not shorter than the lower limit and is shortest may be set as the unloading voltage V6 of the subsequent unloading operations.

According to the configuration, the upper limit of the movement speed of the tray 2 in the loading operation and the unloading operation can be restricted, and a shock which is produced in stopping of the tray 2, or the like can be suppressed. Therefore, the optical disc 5 can be prevented more surely from being damaged.

As described above, according to the invention, the movement speed of a tray is set in consideration of a shock which is produced during a movement of the tray, and therefore an optical disc can be surely prevented from being damaged during a movement of the tray, and the reliability of the main unit of the apparatus can be improved.

The time periods required for the loading and unloading operations can be prevented from being prolonged, and therefore the usability can be improved.

Since the movement speed of the tray is individually determined for each of movement directions of the tray, the loading operation and the unloading operation can be adequately performed.

What is claimed is:

1. An optical disc apparatus comprising:

a tray on which a disc to be loaded into a main unit is to be placed;

a tray moving section which moves the tray between a loading position where the disc is to be loaded into the main unit, and a discharging position where the disc is to be discharged from the main unit;

a shock detecting section which detects a shock that is produced during a movement of the tray by the tray moving section; and a controlling section which controls the tray moving section to perform a movement of the tray a plurality of times at different movement speeds, and which determines separately a speed of a movement of the tray from the loading position to the discharging position, and a speed of a movement of the tray from the discharging position to the loading position, wherein the controlling section determines the movement speeds to values at which a shock that is produced during a movement does not exceed a predetermined upper limit of a shock, and which are not higher than a predetermined upper speed limit of the tray.

2. An optical disc apparatus comprising:

a tray on which a disc to be loaded into a main unit is to be placed;

a tray moving section which moves the tray between a loading position where the disc is to be loaded into the main unit, and a discharging position where the disc is to be discharged from the main unit;

a shock detecting section which detects a shock that is produced during a movement of the tray by the tray moving section; and a controlling section which, on the basis of the shock detected by the shock detecting section, determines a speed of a movement of the tray by the tray moving section.

3. An optical disc apparatus according to claim 2, wherein the controlling section controls the tray moving section to perform a movement of the tray a plurality of times at different movement speeds, and, on the basis of results of the movements, determines a speed of a movement of the tray by the tray moving section.

4. An optical disc apparatus according to claim 2, wherein the controlling section determines separately a speed of a movement of the tray from the loading position to the discharging position, and a speed of a movement of the tray from the discharging position to the loading position.

5. An optical disc apparatus according to claim 2, wherein the controlling section determines the movement speed to a value at which a shock that is produced during a movement does not exceed a predetermined upper limit of a shock, and which is not higher than a predetermined upper speed limit of the tray.

* * * * *